(12) United States Patent
Fuchs et al.

(10) Patent No.: US 9,424,336 B2
(45) Date of Patent: Aug. 23, 2016

(54) FACILITATING DISTRIBUTED DATA PROCESSING FOR DYNAMIC AND EFFICIENT GENERATION OF SEARCH RESULTS IN AN ON-DEMAND SERVICES ENVIRONMENT

(71) Applicants: Matthew Fuchs, Los Gatos, CA (US); Lei Ming, Fremont, CA (US)

(72) Inventors: Matthew Fuchs, Los Gatos, CA (US); Lei Ming, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 362 days.

(21) Appl. No.: 13/963,840

(22) Filed: Aug. 9, 2013

(65) Prior Publication Data

US 2014/0081978 A1 Mar. 20, 2014

Related U.S. Application Data

(60) Provisional application No. 61/701,492, filed on Sep. 14, 2012.

(51) Int. Cl.
*G06F 7/00* (2006.01)
*G06F 17/30* (2006.01)

(52) U.S. Cl.
CPC ................................ *G06F 17/30598* (2013.01)

(58) Field of Classification Search
CPC ................................................. G06F 17/30598
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |

(Continued)

*Primary Examiner* — Loan T Nguyen
(74) *Attorney, Agent, or Firm* — Blakely Sokoloff Taylor & Zafman LLP

(57) ABSTRACT

In accordance with embodiments, there are provided mechanisms and methods for facilitating distributed data processing for dynamic and efficient generation of search results in a multi-tenant environment according to one embodiment. In one embodiment and by way of example, a method includes receiving, at a data processing platform, extracted data occurrences from a database coupled to a server computing device, where each data occurrence may be assigned a classification according to a category. The method may further include mapping values to the data occurrences based on classifications of the data occurrences, mapping prefixes to the data occurrences based on identifying names of the data occurrences, and generating search data based on the mapped values and mapped prefixes, where the search data may represent autosuggestions.

15 Claims, 7 Drawing Sheets

(56) References Cited

U.S. PATENT DOCUMENTS

| | | | |
|---|---|---|---|
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,685,144 B1 * | 3/2010 | Katragadda ........... G06F 3/0237 707/999.101 |
| 7,890,526 B1 * | 2/2011 | Brewer ................ G06F 17/3097 707/767 |
| 8,271,546 B2 * | 9/2012 | Gibbs ................ G06F 17/30887 707/805 |
| 8,990,242 B2 * | 3/2015 | Mohiuddin et al. .......... 707/767 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2010/0169341 A1 * | 7/2010 | Hu ...................... G06F 17/3064 707/758 |
| 2012/0016898 A1 * | 1/2012 | Gibbs ............... G06F 17/30887 707/767 |
| 2012/0089678 A1 * | 4/2012 | Cort et al. ..................... 709/204 |
| 2012/0173513 A1 * | 7/2012 | Agrawal et al. ............... 707/716 |

* cited by examiner

US 9,424,336 B2

FACILITATING DISTRIBUTED DATA PROCESSING FOR DYNAMIC AND EFFICIENT GENERATION OF SEARCH RESULTS IN AN ON-DEMAND SERVICES ENVIRONMENT

CLAIM OF PRIORITY

This application claims the benefit of and priority to U.S. Provisional Patent Application No. 61/701,492, entitled "Distributed Processing Techniques for Generating AutoSuggest Entries" by Matthew Fuchs, et at., filed Sep. 14, 2012, and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating distributed data processing for dynamic and efficient generation of search results in an on-demand services environment.

BACKGROUND

With increasing amounts of data to search, various search techniques are needed to receive up-to-date and accurate results. For example, autosuggest is one such search feature which presents the user with a list of possible completions even before the user inputs the entire term. Although autosuggest is meant to speed up search results, with increasingly large databases to search, the background database processing may take hours or even days to update which in turn delays the delivery of up-to-date and/or accurate results.

The subject matter disclosed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
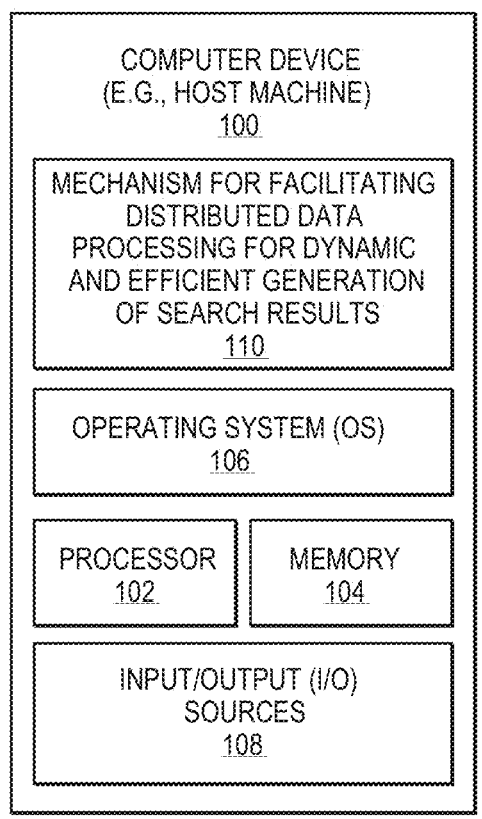
FIG. 1 illustrates a computing device employing a mechanism for dynamic distributed processing of data for efficient generation of search results according to one embodiment.

In accordance with embodiments, there are provided mechanisms and methods for facilitating distributed data processing for dynamic and efficient generation of search results in a multi-tenant environment according to one embodiment. In one embodiment and by way of example, a method includes receiving, at a data processing platform, extracted data occurrences from a database coupled to a server computing device, where each data occurrence may be assigned a classification according to a category. The method may further include mapping values to the data occurrences based on classifications of the data occurrences, mapping prefixes to the data occurrences based on identifying names of the data occurrences, and generating search data based on the mapped values and mapped prefixes, where the search data may represent autosuggestions.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating distributed data processing for dynamic and efficient generation of search results in a multi-tenant environment according to one embodiment. In one embodiment and by way of example, a method includes receiving, at a data processing platform, extracted data occurrences from a database coupled to a server computing device, where each data occurrence may be assigned a classification according to a category. The method may further include mapping values to the data occurrences based on classifications of the data occurrences, mapping prefixes to the data occurrences based on identifying names of the data occurrences, and generating search data based on the mapped values and mapped prefixes, where the search data may represent autosuggestions.

Embodiments provide for dynamic and efficient generation and display of search results in an on-demand environment. For example and in one embodiment, distributed processing may be performed to significantly reduce the time it takes to perform the background processing and updates of database contents so that up-to-date and accurate results may be provided in response to every search query, such as an autosuggest query. It is contemplated that embodiments may be applied to other forms of searching techniques; however, autosuggest is referenced throughout this document as an example for brevity, clarity and ease of understanding.

Autosuggest is a feature of a search field that treats the current input as a prefix and presents the user with a list of possible completions by pre-computing a mapping from prefixes to a list of values to be presented. For example, if a user has entered "jo" into a field, the system may display names such as "john smith", "jose martinez", "joan allen", etc., as possible completions, allowing the user to either continue typing or choose one of the results and discontinue typing the full name. For example, Data.com™ by Salesforce.com® offers autosuggest to allow searching for most likely individual names, company names, and/or titles for each prefix that is entered by a user. The distributed processing, in one embodiment, provides for a faster background processing (e.g., mapping, sorting, updates, etc.) of the contents of databases associated with a database (e.g., Data.com) to offer fast, up-to-date, and accurate requests to all user search queries, such as autosuggest queries.

Embodiments provide for employing one or more data processing server computer machines/platforms (e.g., Apache™ Hadoop®, etc.) to distill and distribute data processing to significantly reduce the runtime for background data processing from several days to only hours or from several hours to only minutes and so forth. This integration of disparate data processing architectures/platforms results in a distributed background processing and management of resources where, for example, a database platform (e.g., Force.com® by Salesforce.com®, etc.) may manage contents of a database (e.g., Data.com) and receive user queries, etc., while a data processing platform, such as Hadoop, may perform the background processing of large datasets associated with the database for facilitating the return and display of fast and up-to-date results to the user queries.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing a mechanism for facilitating distributed data processing for dynamic and efficient generation of search results 110 according to one embodiment. In one embodiment, computing device 100 serves as a host machine employing mechanism for dynamic distributed processing of data for efficient generation of search results ("distributed processing mechanism") 110 for facilitating dynamic distributed processing and management of data and performance of background data processing through integration and/or communication of disparate data processing platforms for fast, up-to-date, and efficient generation and display of search/query results in a multi-tiered, multi-tenant, on-demand environment.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, now known and trading as BlackBerry®, etc.), handheld computing devices, personal digital assistants (PDAs), tablet computers (e.g., iPad® by Apple®, Galaxy® by Samsung®, etc.), laptop computers (e.g., notebooks, netbooks, ultrabooks, etc.), e-readers (e.g., Kindle® by Amazon.com®, Nook® by Barnes and Nobles®, etc.), Internet-based cable setup boxes, Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document and further, terms like "job", "input", "request" and "message" may be used interchangeably throughout this document. Additionally, terms like "data" and "content" may be used interchangeably throughout this document.

It is contemplated that any references to data processing platforms (e.g., Hadoop, Postgres™, HBase™, Apache Oozie™, OpenTSDB™, Oracle™, SAP™, etc.), other software, servers, databases, and data processing platforms (e.g., Data.com, Force.com, Tableau®, Gephi®, etc.), application programming interfaces (APIs) (e.g., Java API, Representational State Transfer (REST) API, Oozie API, etc.), data/metadata (e.g., individual names, company names, titles, Customer Relationship Model (CRM) data/metadata, etc.), computing devices (e.g., server computers, desktop computers, mobile computers, such as tablet computers, smartphones, etc.), software development languages, applications, and/or development tools or kits (e.g., Apache Pig™, Java®, The R Project™, Force.com®, Force.com Apex™ code, JavaScript™, jQuery™, Developerforce™, Visualforce™, Service Cloud Console Integration Toolkit™, Platform on a Service™ (PaaS), Chatter® Groups, Sprint Planner®, MS Project®, etc.), etc., are made as examples for brevity, clarity, and ease of understanding and that embodiments are not limited to any such references.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of distributed processing mechanism 110 or the organization's representative, such as a salesperson, a sales manager, a product manager, an accountant, a director, an owner, a president, a computer programmer, an information technology (IT) representative, etc. It is to be noted that terms like "user", "customer", "organization", "tenant", "business", "company", etc., may be used interchangeably throughout this document.

Figure 2:
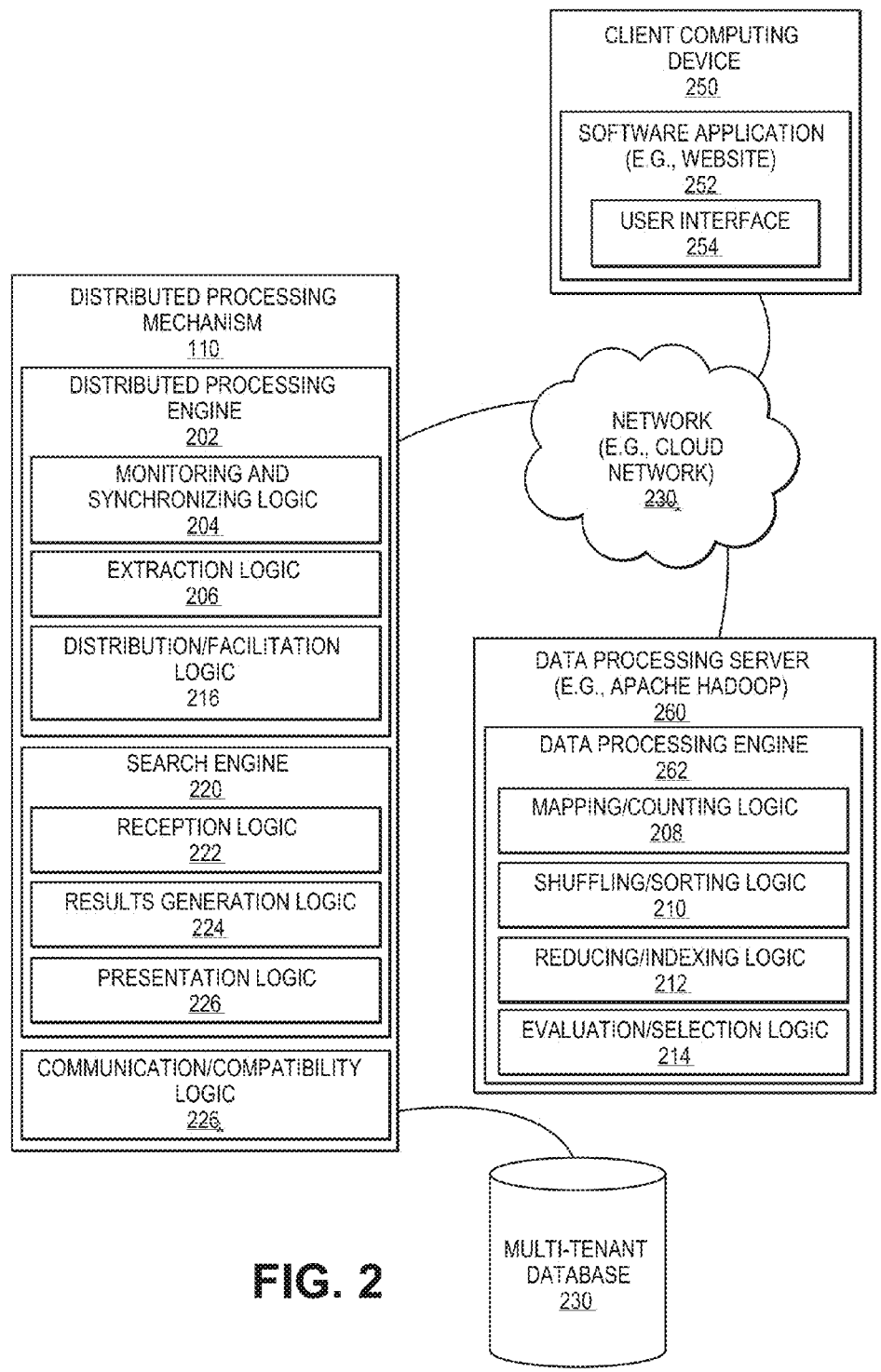
FIG. 2 illustrates a mechanism for dynamic distributed processing of data for efficient generation of search results according to one embodiment.

FIG. 2 illustrates a mechanism for facilitating distributed data processing for dynamic and efficient generation of search results 110 according to one embodiment. In one embodiment, distributed processing mechanism 110 may be employed at a server computing system, such as host machine 100 of FIG. 1, and includes one or more components, such as: distributed processing engine 202 including monitoring and synchronization logic 204, extraction logic 206, distribution/facilitation logic 216, search engine 220 including reception logic 222, results generation logic 224, and presentation logic 226; and communication/compatibility logic 228.

Distributed processing mechanism 110 may be in communication with one or more local databases/database platforms, such as multi-tenant database 230 (e.g., Force.com, etc.), one or more remote data processing servers or platforms, such as data processing server 260 (e.g., Hadoop, etc.) having data processing engine 262, over one or more networks, such as network 240. In one embodiment, data processing engine 262 may include one or more components, such as mapping/counting logic 208, shuffling/sorting logic 210, reducing/indexing logic 212, and evaluation/selection logic 214. In some embodiments, distribution/facilitation logic 216 may be used to distribute various operations/processes of the two sets or steps (also interchangeably referred to as "processes", "operations", "sets of operations", etc.) of the map/reduce process to data processing engine 262 such that mapping/counting logic 208, shuffling/sorting logic 210, reducing/indexing logic 212, and evaluation/selection logic 214 are facilitated to perform the various operations/processes of both sets of the map/reduce process. Further, distributed processing mechanism 110 may be in communication with one or more computing devices, such as client computing device 250 having one or more software applications or tools, such as software application 252 (e.g., website, etc.), providing one or more interfaces, such as user interface 254, over network 240. In one embodiment, local database 230 may serve as an intermediary layer or tier between, for example, the user-level equipment, such as client computing device 250, and a cluster of remote data processing servers, such as data processing server 260.

Throughout this document, terms like "logic", "component", "module", and "engine" may be interchangeably referenced and include, by way of example, software, hardware, and/or any combination of software and hardware, such as firmware. Furthermore, any use of a particular brand, word, or term, such as "distributed processing", "map/reduce", "MapReduce", "Data.com", "Hadoop", "Java", "CRM", etc., should not be read to limit embodiments to software and/or devices that carry that label in products or in literature external to this document.

In one embodiment, monitoring and synchronization logic 204 of distributed processing engine 202 may continuously monitor contents of a database application, such as Data.com, to keep track of any changes (e.g., additions, deletions, modifications, etc.) to the existing contents at database 230. For example, if a new contact is added or an existing contact is modified in Data.com, this information may be tracked and continued to be monitored by monitoring and synchronization logic 204. Further, given that in some embodiments, an entire cluster (or even clusters) of data processing servers, such as processing server 260, may be employed and used for distributed processing of data, monitoring and synchronization logic 204 may also be used to ensure synchronization of contents (e.g., indices, prefixes, contact details, etc.), processes, processing stages, sets of operations, etc., between all data processing servers in the cluster before, after, and during various stages of distributed processing.

In one embodiment, extraction logic 206 may extract data files or occurrences from multi-tenant database 230 for processing. For example, in case of Data.com, data files relating to individual/contact names (such as any combination of an individual's first name, middle initial/name, last name, prefix, suffix, etc., such as John T. Smith, Dr. Susan Best, Imran Khan, Esq., etc.), company names (e.g., Apple Corp., ABC Plumbing, etc.), contact titles (e.g., chief accountant, sales manager, president, receptionist, etc.), etc., may be extracted for processing. It is contemplated that extraction features are not limited to a particular set of details and may be altered to include other details (e.g., contact's phone number, street address, etc.) and similarly, certain details may be excluded. In one embodiment, various processes of distributed processing engine 202 may be facilitated or outsourced by distribution/facilitation logic 216 to be performed by various components 208-214 of data processing engine 262 at data processing server 262, where the results of the processing may then be cached back at multi-tenant database 230 such that various processes of search engine 220 may then be facilitated to obtain search data or results for the benefit of the user.

Briefly and in one embodiment, the extracted data occurrences may be moved to a file system at data processing engine 262 where index files may be created and moved back to a local file system at database 230 where they may be cached as search data, such as autosuggestions. More specifically, continuing with the example of autosuggestion being the search technique, Data.com providing the database contents, and Hadoop serving as data processing engine 262, a map/reduce technique for distributed processing may be employed. For example, a MapReducer program for Hadoop may be deployed while the extracted files are uploaded to the Hadoop data file system via an API, such as Java API. After the MapReducer job is completed, the output files may be merged into three files, such as contact name, contact title, and company name. Then, this set of three files may be moved back to database 230 with a cache loader to cache the data for subsequent autosuggestion queries, where the cache loader may be a multi-threaded program that is tunable and scalable. Alternatively, the output files may be left in the deployer's home directory while a softlink to these files may be created.

In one embodiment, the various processes facilitated by distribution processing engine 202 may be collectively referred to as the "map/reduce process" and the term "MapReducer" refers to this map/reduce process. For example, in the map phase of the map/reduce process, each data occurrence or item is processed and a number of data occurrences are returned as (key, value) pairs. This is followed by sorting in which the output of the map process is sorted by its associated key or index. The reduce phase of the map/reduce process is then executed where all values having the same key are processed together and a common output is achieved. It is contemplated that any number of map/reduce processes may be running on different data processing servers, such as data processing server 260, in the cluster and thus the various processes and their outputs may be synchronized, via monitoring and synchronization logic 206, to ensure the same and accurate result, such as all values with a single key may result in the same recued process. However, as aforementioned, terms like "MapReducer" or "map/reduce" should not be read to limit embodiments to software and/or devices that carry that label in products or in literature external to this document.

Since Data.com-based contents are sorted by company name, contact name, and contact title, examples of extracted data files and formats may include 1) company_name_xxx_yyy.csv—<company name> <active contact count>, and 2) contact_xxx_yyy.csv—<first name> <last name> <title>, etc. Similarly, examples of output index files and formats may include 1) company_suggestions.txt—<prefix> <auto suggestion> <weight in terms of company's active contact count>, 2) full_name_suggestions.txt—<prefix> <auto suggestion> <count of same contact full name>, and 3) title_suggestions.txt—<prefix> <auto suggestion> <count of contacts with the same title>. It is contemplated the aforementioned formats are merely provided as examples and that embodiments are not limited to any particular form, format, file, text, feature, term, programming language, etc., to achieve distributed processing.

Referring back to distributed processing engine 202, the first set of operations of the map/reduce process is performed by having distribution/facilitation logic 216 facilitate mapping/counting logic 208 at data processing engine 262 to process the extracted data by determining a count for all values for which prefixes are computed and assigned and, as mentioned previously, in the map phase of the map/reduce process, mapping/counting logic 208 ensures that each value is read. Shuffling/sorting logic 210 may then sort or shuffle the values by their corresponding keys. Continuing with the Data.com example, if, for example, a value is a contact name or a contact title, the input value itself, such as the contact name or the contact title, may be regarded as the key and the integer 1 may be its assigned as its value. Similarly, for companies, the company name may be regarded at the key, while the number of contacts associated with that company may be regarded as its value.

Once the sorting is completed, the reduce phase is triggered where each key (e.g., contact name, contact title, and company name, etc.) corresponding to a value, such as 1 for contact names and contact titles and a single value (e.g., number of contacts) for companies, is associated with an appropriate weight by reducing/indexing logic 212. For example, summing up the numbers associated with the values may provide a level of cardinality or certain importance to such values which, when at database 230, may then be used for performing various tasks, such as final weighing, sorting, reduction purposes in response to user queries, etc.

Now, in one embodiment, the map/reduce process continues with its second set of operations. As with the first set, the second set of operations of the map/reduce process may be performed by mapping/counting logic 208, shuffling/sorting logic 210, and reducing/indexing logic 212 of data processing engine 262. In one embodiment, reducing/indexing logic 212 continues with generating an autosuggest index that can then be used for responding to queries. The second set continues with mapping/counting logic 208 performing the next operation, such as, for example, each entry may be broken down into a prefix and an item emitted for each prefix, with the prefix as part of the key and the original input (e.g., having a full string, type, and cardinality) as the value. For example, an autosuggest query for "IBM" may be broken down, via mapping/counting logic 210, into prefixes "I", "IB", and "IBM" which are regarded as keys. Further, let us suppose in Data.com, stored at database 230, there are 10,000 contacts associated with IBM which are then regarded as value. Since IBM is a company, a letter "C" for company may be added to the value (e.g., the value part of the key/value pair to distinguish various search items, such as company names for individual names, title, etc.), so the input for IBM may be translated into "C IBM 10000" and mapping/counting logic 208 may then provide an output of multiple entries as follows: (I, C IBM 10000), (IB, C IBM 10000), and (IBM, C IBM 10000).

Having sorted the entries, via shuffling/sorting logic 210, all the entries with the same prefix come together such that they can be reduced to a single value with the right of entries to be processed by reducing/indexing logic 212. In one embodiment, the output is then received at reducing/indexing logic 212 for reduction and indexing of its entries. For example, reducing/indexing logic 212 may cull a number of entries based on one or more criteria, such as the likelihood of the name being the one the user is seeking, the number of contacts associated with the company, etc., and provides another output (e.g., a reduced number of entries) that is then processed by evaluation/selection logic 214. Continuing with the IBM example, for the first option of "I", any number of possible answer may be retrieved, such as C IBM 10000, C Intel 8000, P Isaac Byron 85, T Interpreter 1000, C I-Behavior 50, etc., where "P" stands for person or individual contact and "T" stands title. In this case, the results are mixed having included companies, contacts, and titles, etc., but the user may have the option of viewing or requesting a single result category, such company results or contact results or title results by simply clicking on the appropriate tab via user interface 254. Similarly, a revised set of results (of companies, contacts, titles) may be retrieved when the prefix progresses from "I" to "IB" and then on to "IBM", but each result may include IBM for having all three letter of the prefix. For example, the final result of companies, in response to the autosuggest query of "IBM", may top the rows with "IBM" or "International Business Machines Corporation" with its 10,000 contacts and other columns having other information, such as city name, state name, country name, etc., relating to the company, such as IBM. This first row listing of "IBM" may be followed by any number of rows having other near-matches, such as "IBM Employees Federal Credit Union" with 100 contacts, "Alliance® IBM" with 50 contacts, "Institute of Biomedical Sciences" with 8 contacts, and so forth.

The output produced by reducing/indexing logic 212 is then received at evaluation/selection logic 214 where it is further evaluated in light of any predetermined default criteria, such as limiting the results to only 5 companies or 10 contacts, etc., by sorting the companies by the number of corresponding contacts, sorting the titles by relevance, sorting the contacts in alphabetical order, etc. In one embodiment, some or all of the default criteria may be altered by the user requesting their own criteria (e.g., list 50 company names in alphabetical order, etc.) which may then be considered and processed by result generation logic 224, in real-time, in response to a live user request.

Upon concluding the second set of operations of the map/reduce process at distributed processing engine 202, the output data may be cached at database 230 from where it can be retrieved to respond to various user queries. For example, an autosuggest user query may be placed by a user via user interface 254 of software application 252 at computing device 250, and received at reception logic 222 of search engine 220 which may then be forwarded on to results generation logic 224 to retrieve the relevant data from database 230 in response to the user query. In one embodiment, results generation logic 224 may update the retrieved data in light of the default and/or any user-preferred criteria and communicates the updated search data to presentation logic 226. Presentation logic 226 places the result in a final/presentable form and facilitates communication/compatibility logic 228 to communicate the final results to computing device 250, over network 240, where these results may then be displayed at a display device via user interface 254.

Communication/compatibility logic 228 may facilitate the ability to dynamically communicate and stay configured with any number and type of software/application developing tools, models, data processing servers, database platforms and architectures, programming languages and their corresponding platforms, etc. Communication/compatibility logic 228 further facilitates the ability to dynamically communicate and stay configured with various computing devices (e.g., server computing device, mobile computing devices, such as smartphones, tablet computers, laptop, etc.), networks (e.g., cloud network, intranet, the Internet, proximity network, such as Bluetooth, WiFi, etc.), websites (e.g., social networking websites, such as Facebook®, LinkedIn®, Google®, Twitter®, etc.), and the like, while ensuring compatibility with changing technologies, parameters, protocols, standards, etc.

It is contemplated that any number and type of components may be added to and/or removed from distributed processing mechanism 110 to facilitate various embodiments including adding, removing, and/or enhancing certain features. For brevity, clarity, ease of understanding, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
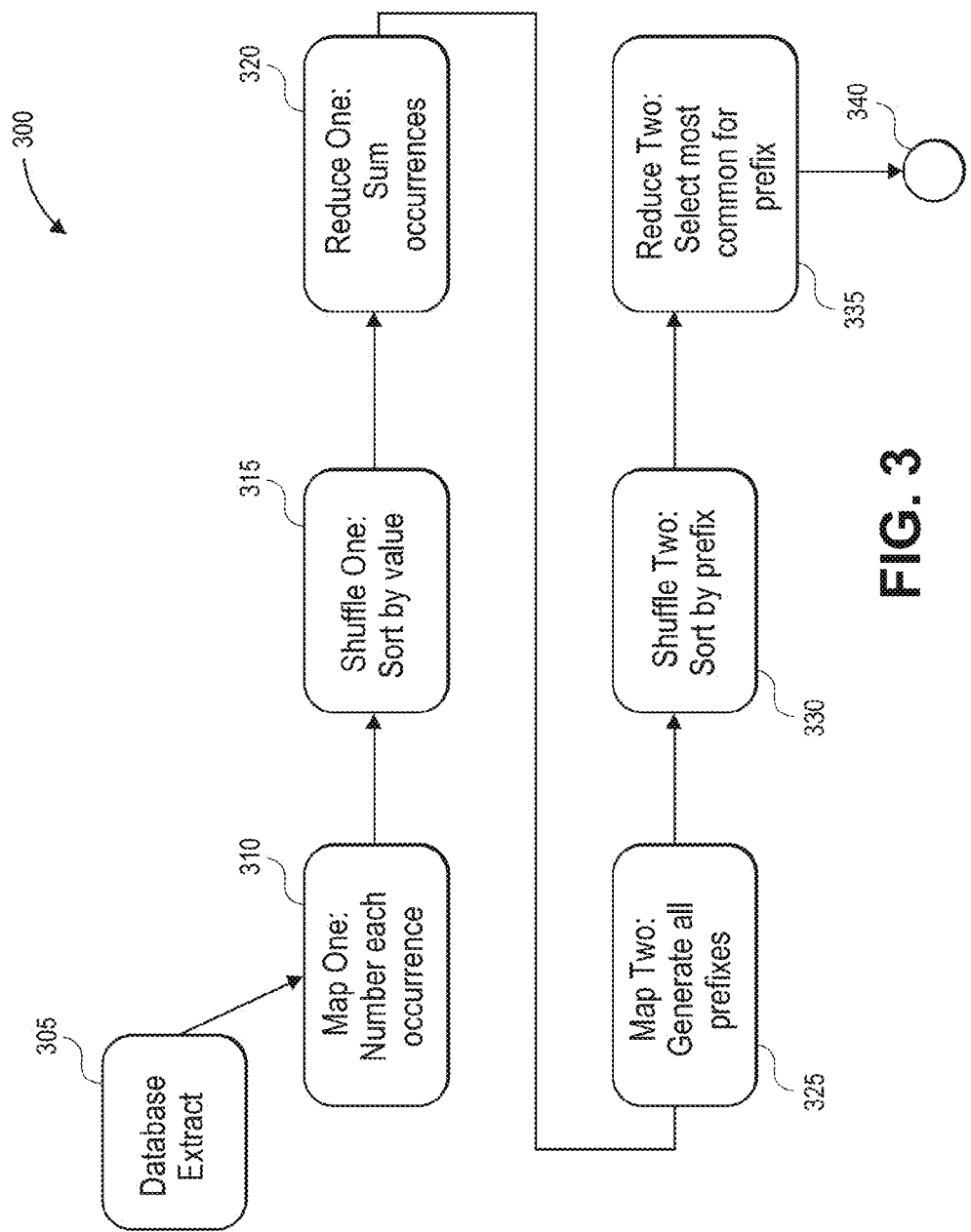
FIG. 3 illustrates a method for facilitating distributed data processing for dynamic and efficient generation of search results in an on-demand services environment in a multi-tenant environment according to one embodiment.

FIG. 3 illustrates a transaction sequence 300 for facilitating distributed data processing for dynamic and efficient generation of search results in an on-demand services environment in a multi-tenant environment according to one embodiment. Method 300 may be performed by processing logic that may comprise hardware (e.g., circuitry, dedicated logic, programmable logic, etc.), software (such as instructions run on a processing device), or a combination thereof. In one embodiment, transaction sequence 300 may be performed by distributed processing mechanism 110 and/or data processing engine 262 of FIG. 2.

Transaction sequence 300 begins at block 305 with extraction of data from a local database for data processing. At block 310, each data occurrence from the data is assigned a number representing its value, such as a contract name or a title name may be assigned number 1 while a company may be assigned a number equivalent to the number of contacts associated with the company. At block 315, these values are then sorted, such as in ascending or descending order. At block 320, all data occurrences are summed up according to their numbers for reduction purposes. At block 325, prefixes of the data occurrences are generated, such as "I", "IB" and "IBM" for IBM, so that a number of responses may be retrieved and generated for each prefix, such as I, IB, and IBM, when an autosuggestion query is submitted by a user. At block 330, another sorting is performed and this sorting is performed based on the prefixes in any particular order, such as in alphabetical order, etc. At block 335, the most common outcome based on the prefixes is selected, such as IBM may be returned for the user submitting an autosuggestion query of I-B-M, such as I followed by IB followed by IBM. Transaction sequence ends at block 340.

Figure 4:
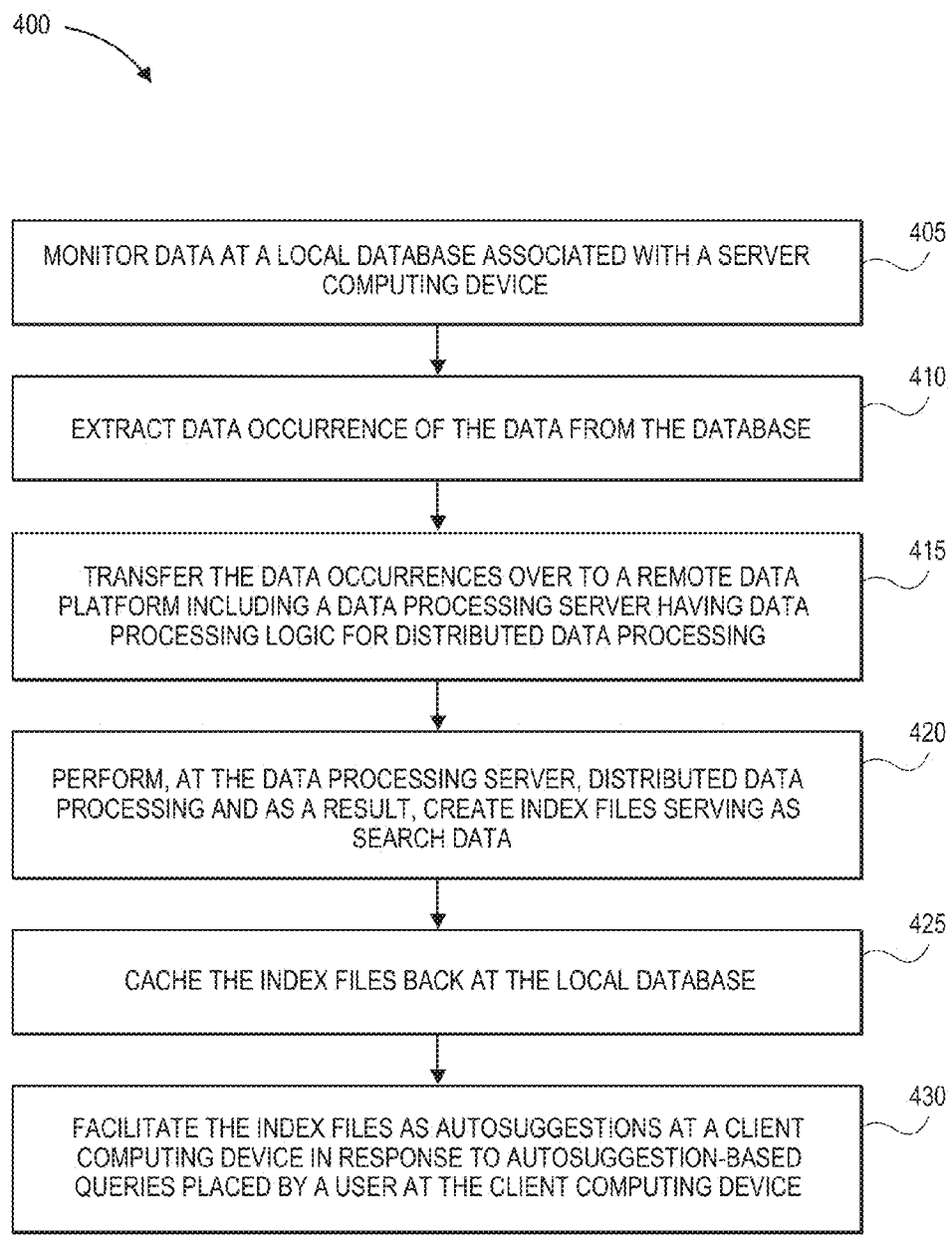
FIG. 4 illustrates a method for facilitating distributed data processing for dynamic and efficient generation of search results in an on-demand services environment in a multi-tenant environment according to one embodiment.

FIG. 4 illustrates a method 400 for facilitating distributed data processing for dynamic and efficient generation of search results in an on-demand services environment in a multi-tenant environment according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by distributed processing mechanism 110 and/or data processing engine 262 of FIG. 2.

Method 400 begins at block 405 with monitoring of data at a local database associated with a server computing device. At block 410, data occurrences are extracted from the data at the database. At block 415, the extracted data occurrences are transferred over to a remote data platform including a data processing server having a data processing engine for performing distributed data processing. At block 420, distributed data processing is performed at the data processing sever and as a result, index files serving as search data are created. At block 425, the index files are cached back at the local database. At block 430, index files are facilitated as autosuggestions at a client computing device in response to autosuggestion-based queries placed by a user at the client computing device.

Figure 5:
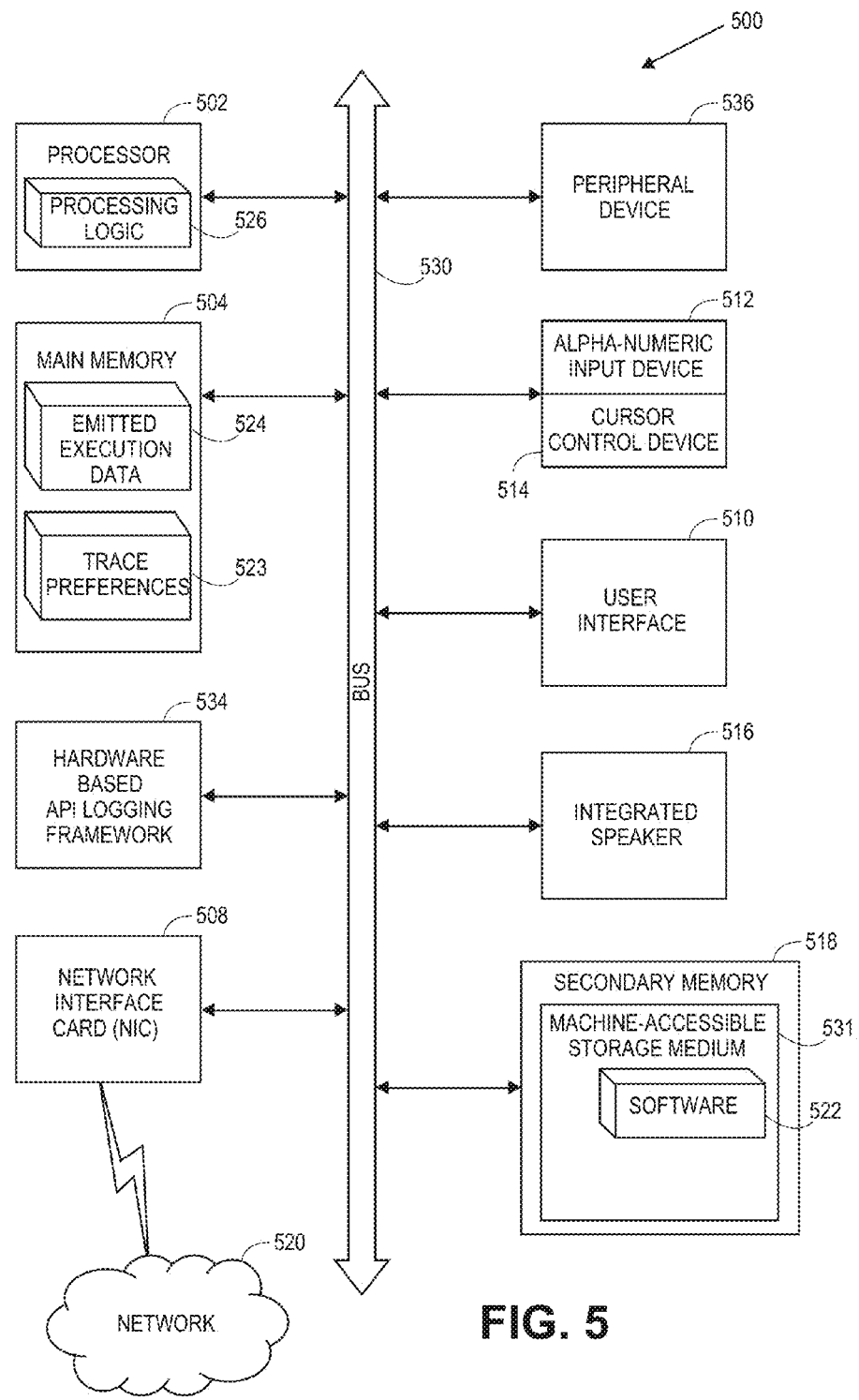
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 250 of FIG. 1 and FIG. 2, respectively. In alternative embodiments, the machine may be connected (e.g., networked) to other machines in a network (such as host machine 100 of FIG. 1 connected with client machine 250 over network 240 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable or executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT), an alphanumeric input, device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form or propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling or the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
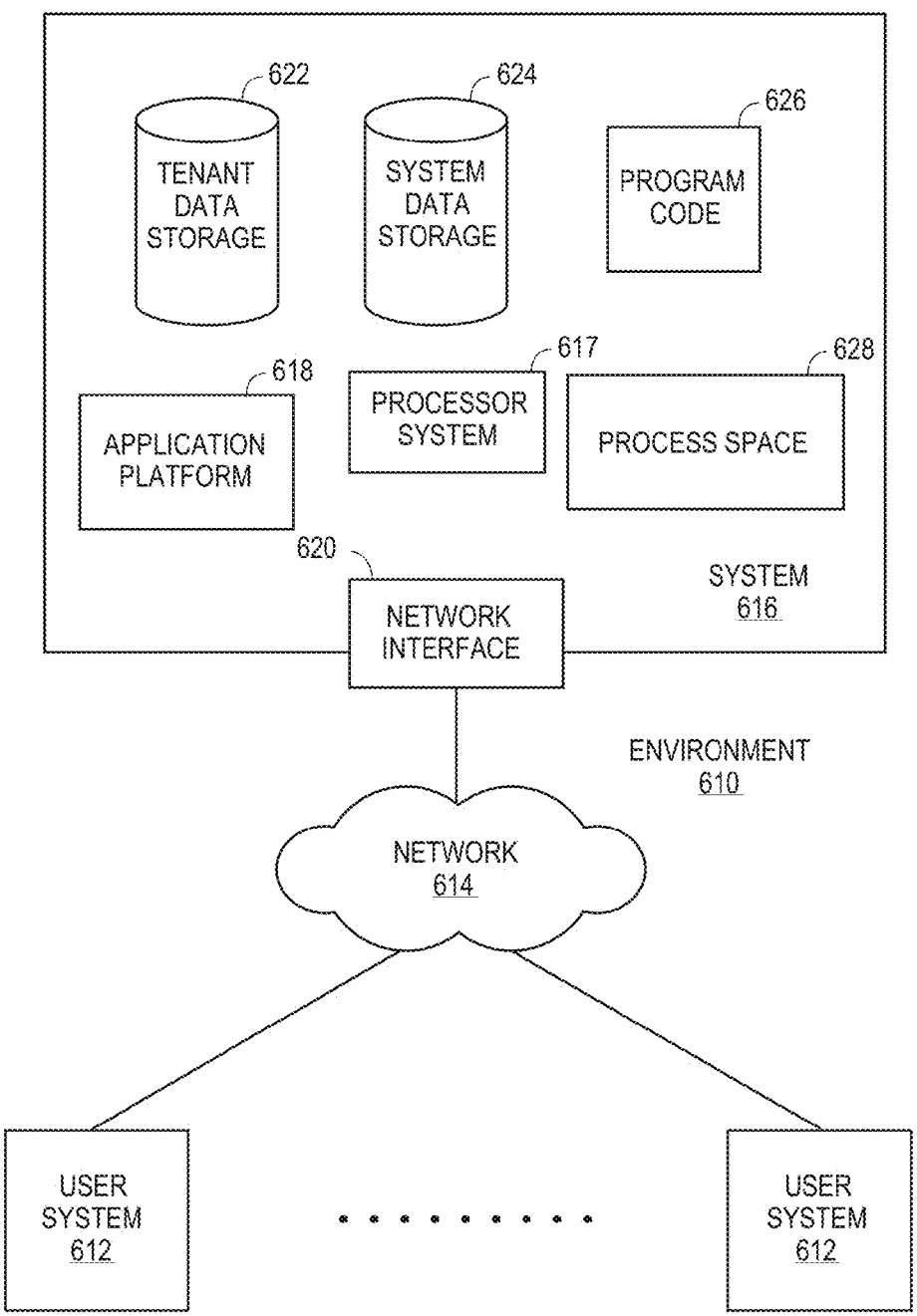
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand or the users). Some on-demand database services may store information from one or more tenants stored into tables of a common database image to form a multi-tenant database system (MTS). Accordingly, "on-demand database service 616" and "system 616" will be used interchangeably herein. A database image may include one or mom database objects. A relational database management system (RDMS) or the equivalent may execute storage and retrieval or information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems of 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I", that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet etc) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.)

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
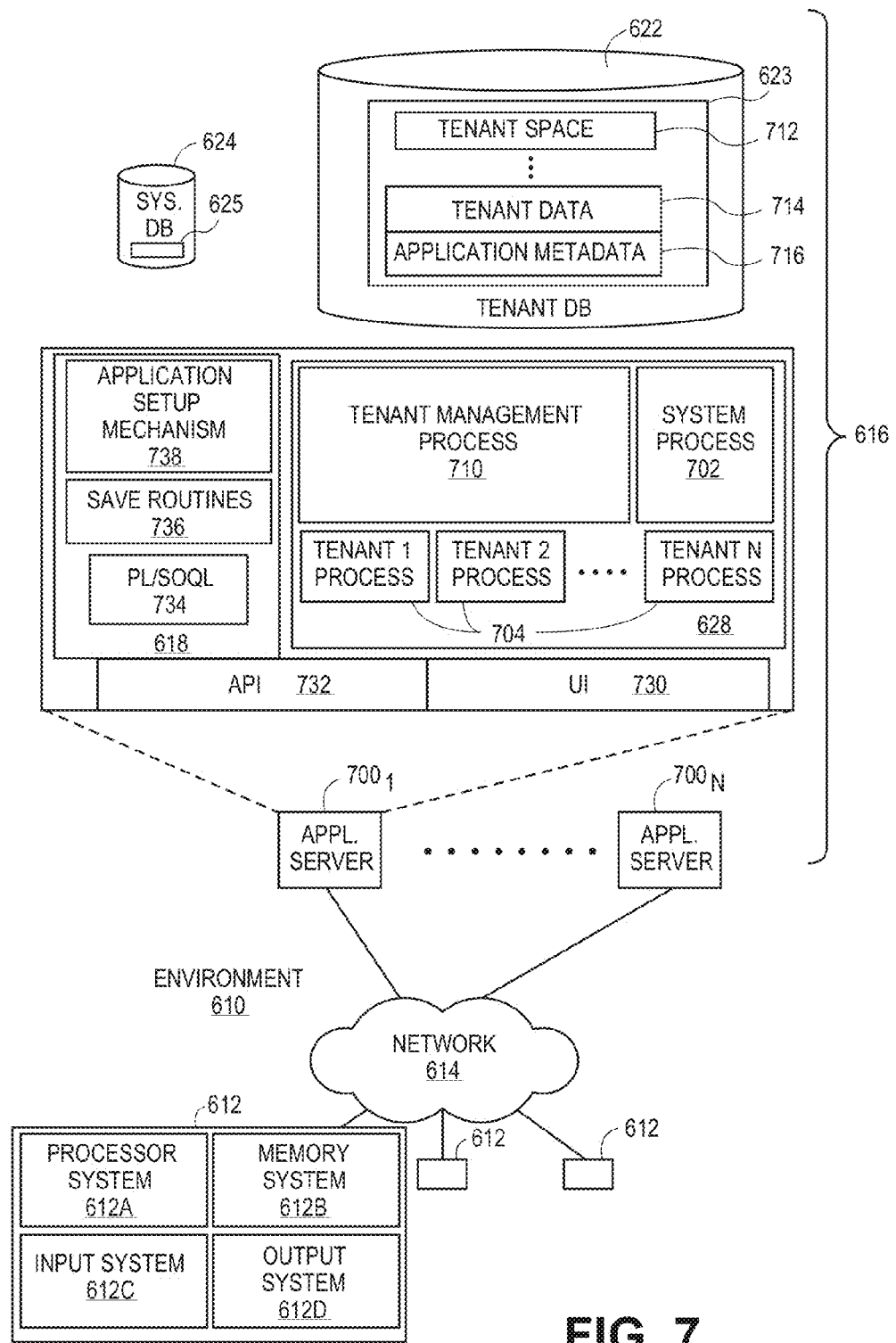
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user, for example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may decoded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level.

Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description or objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create said store custom objects, or they may be allowed to customize standard entitles or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method, comprising:
    monitoring, by a local query platform of the database system, data at a database communicatively coupled to the local query platform, wherein monitoring includes detecting one or more data occurrences in the data, wherein the one or more data occurrences include one or more modifications to one or more portions of the data relating to one or more tenants in a multi-tenant environment;
    transmitting, by the local query platform, the one or more data occurrences from the database to a remote data processing entity to process the one or more data occurrences, wherein results of the processing of the one or more data occurrences are cached at the database by the remote processing entity over a network, wherein the one or more data occurrences are assigned one or more classifications relating to the one or more tenants;
    mapping, by the local query platform, one or more values to the results of the one or more data occurrences based on the one or more classifications; and
    generating, by the local query platform, search data from the results based on the mapped values such that a customized portion of the search data is suggested to a tenant in response to a query placed by the tenant.

2. The method of claim 1, wherein the database comprises a local multi-tenant database.

3. The method of claim 1, wherein the search data including the customized portion of the search data is communicated to a computing device over the network including a cloud network, wherein the computing device includes a client computer accessible to the tenant.

4. The method of claim 3, wherein the customized portion of the search data to trigger and present automatic suggestions in response to one or more search queries placed at the computing device by a user representing the tenant, wherein the automatic suggestions include one or more predictive answers to the one or more search queries.

5. The method of claim 1, wherein the one or more predictive answers are based on processing of data occurrences by the remote data processing entity, wherein the one or more predictive answers are further based on a search history of the tenant such that a first portion of a predictive answer is pre-computed to match with a second portion of the predictive answer, wherein a first value of the first portion is predictively mapped to a second value of the second portion.

6. A system comprising:
    a computing device having a processing device coupled with memory to store instructions relating to a mechanism, wherein the instructions, when executed by the processing device, cause the processing device to perform operations comprising:
        monitoring, by a local query platform of the database system, data at a database communicatively coupled to the local query platform, wherein monitoring includes detecting one or more data occurrences in the data, wherein the one or more data occurrences include one or more modifications to one or more portions of the data relating to one or more tenants in a multi-tenant environment;
        transmitting, by the local query platform, the one or more data occurrences from the database to a remote data processing entity to process the one or more data occurrences, wherein results of the processing of the one or more data occurrences are cached at the database by the remote processing entity over a network, wherein the one or more data occurrences are assigned one or more classifications relating to the one or more tenants;
        mapping, by the local query platform, one or more values to the results of the one or more data occurrences based on the one or more classifications; and
        generating, by the local query platform, search data from the results based on the mapped values such that a customized portion of the search data is suggested to a tenant in response to a query placed by the tenant.

7. The system of claim 6, wherein the database comprises a local multi-tenant database.

8. The system of claim 6, wherein the search data including the customized portion of the search data is communicated to a computing device over the network including a cloud network, wherein the computing device includes a client computer accessible to the tenant.

9. The system of claim 8, wherein the customized portion of the search data to trigger and present automatic suggestions in response to one or more search queries placed at the computing device by a user representing the tenant, wherein the automatic suggestions include one or more predictive answers to the one or more search queries.

10. The system of claim 6, wherein the one or more predictive answers are based on processing of data occurrences by the remote data processing entity, wherein the one or more predictive answers are further based on a search history of the tenant such that a first portion of a predictive answer is pre-computed to match with a second portion of the predictive answer, wherein a first value of the first portion is predictively mapped to a second value of the second portion.

11. A machine-readable medium having stored thereon instructions which, when executed by a machine, cause the machine to perform operations comprising:
    monitoring, by a local query platform of the database system, data at a database communicatively coupled to the local query platform, wherein monitoring includes detecting one or more data occurrences in the data, wherein the one or more data occurrences include one or more modifications to one or more portions of the data relating to one or more tenants in a multi-tenant environment;
    transmitting, by the local query platform, the one or more data occurrences from the database to a remote data processing entity to process the one or more data occurrences, wherein results of the processing of the one or more data occurrences are cached at the database by the remote processing entity over a network, wherein the one or more data occurrences are assigned one or more classifications relating to the one or more tenants;
    mapping, by the local query platform, one or more values to the results of the one or more data occurrences based on the one or more classifications; and
    generating, by the local query platform, search data from the results based on the mapped values such that a customized portion of the search data is suggested to a tenant in response to a query placed by the tenant.

12. The machine-readable medium of claim 11, wherein the database comprises a local multi-tenant database.

13. The machine-readable medium of claim 11, wherein the search data including the customized portion of the search data is communicated to a computing device over the network including a cloud network, wherein the computing device includes a client computer accessible to the tenant.

14. The machine-readable medium of claim 13, wherein the customized portion of the search data to trigger and present automatic suggestions in response to one or more search queries placed at the computing device by a user representing the tenant, wherein the automatic suggestions include one or more predictive answers to the one or more search queries.

15. The machine-readable medium of claim 11, wherein the one or more predictive answers are based on processing of data occurrences by the remote data processing entity, wherein the one or more predictive answers are further based on a search history of the tenant such that a first portion of a predictive answer is pre-computed to match with a second portion of the predictive answer, wherein a first value of the first portion is predictively mapped to a second value of the second portion.

\* \* \* \* \*